Patented Oct. 16, 1951

2,571,901

UNITED STATES PATENT OFFICE 2,571,901

CHLORINATING PROCESS

Francis Earl Lawlor, Niagara Falls, N. Y., assignor to Niagara Alkali Company, New York, N. Y., a corporation of New York No Drawing. Application December 12, 1945, Serial No. 634,615

14 Claims. (Cl. 260—408)

1

This invention relates to the chlorination of organic compounds in which hydrogen is substituted by chlorine, and more particularly to the substitution chlorination of aliphatic and other non-aromatic organic compounds of relatively high molecular weight, to provide chlorinated compounds having a higher chlorine content than can be obtained easily by processes known heretofore.

The conventional method of chlorinating to a high chlorine content is to dissolve the compound to be chlorinated in a solvent inert to chlorine, such as carbon tetrachloride, and then to treat the solution with gaseous chlorine under suitable temperature and pressure conditions, usually in the presence of a catalyst or catalytic actinic light conditions. By this method it is difficult to obtain chlorinated compounds having a high chlorine content, particularly in the case of relatively high molecular weight compounds. It is usually necessary to use a relatively high temperature in order for this type of chlorination method to proceed at a rate which is practically feasible. Under such conditions there is often chlorinolysis of the reaction product or other decomposition reactions, resulting in impurities and discoloration as well as in a decrease in the stability of the chlorinated organic compounds.

The art has long wanted perchlorinated organic compounds, especially of the higher molecular weight organic compounds, which are characterized by a very high chlorine content, which are substantially white or colorless, which are free of decomposition products, and which are also relatively stable. In accordance with the invention, it has now been found that such highly desirable perchlorinated products of the wanted properties may be prepared by a new and commercially feasible method.

It has been discovered, in accordance with the broadest aspect of the invention, that aliphatic and other saturated organic compounds may be chlorinated to a high degree by dissolving said compound in liquid chlorine, and while maintaining the chlorine in a liquid state by suitable adjustment of the temperature and pressure in the reaction vessel, subjecting the solution to reaction conditions, such as the presence of actinic light or the maintenance of suitable temperatures or both. The liquid chlorine not only acts as the chlorinating agent but also functions as the solvent or medium for the reacting components and for the chlorinated products. The chlorination results from a substitution of chlorine for hydrogen attached to carbon in the organic compound with the liberation of hydrogen

2 chloride. The reaction is exothermic, and may proceed until no more hydrogen chloride is liberated under the reaction conditions. The reaction may be stopped at any time by removing the source of light, for example, or by cooling the reaction vessel below the reaction temperature. After the reaction is terminated, the resulting perchlorinated compound can be recovered by the evaporation of the liquid chlorine.

At the outset, and before describing the best modes of carrying out the process of the invention, it is believed desirable to point out that there are at least two general types of chlorination processes. In one of such processes chlorine is added to unsaturated (including aromatic) compounds to convert the compound into a saturated compound. Examples are the conversion of olefins such as ethylene to chlorinated hydrocarbons which can then be viewed as members of the saturated or paraffin series, and the conversion of aromatic hydrocarbons to chlorinated hydrocarbons of the alicyclic series. In this type of chlorination there is no formation of hydrogen chloride as a by-product. The reaction proceeds with relatively great ease and, in fact, one of the difficulties in many instances is to prevent it from proceeding too fast. The reaction of these unsaturated aliphatic and aromatic compounds involves considerations peculiar to this type of reaction, and the invention is to be distinguished therefrom. Aromatics, in particular, involve special considerations in view of the unique character of the unsaturated nature of such compounds and their reactivity. I am aware, for instance, that it has been proposed to treat aromatic hydrocarbons such as benzene with liquid chlorine to form chlorinated alicyclic compounds by addition chlorination. The invention is to be distinguished from such a proposal.

The substitution chlorination process, on the other hand, in which the hydrogen of a saturated compound is replaced by chlorine with the formation of hydrogen chloride as a by-product, is an entirely different type of reaction and is to be distinguished from the addition type of chlorination which in general proceeds readily to complete saturation. Substitution chlorination proceeds with greater difficulty, especially as the proportion of chlorine in the molecule increases, and involves special chemical considerations not involved in additive chlorination.

My invention is based on the unobvious discovery that saturated compounds, especially higher molecular weight aliphatic compounds, can have a large proportion of the hydrogen therein substituted by chlorine so as to form very highly chlorinated compounds, if liquid chlorine is used as the solvent and the chlorinating agent during the reaction.

The invention includes as advantages the use of the same medium as the solvent and chlorinating agent, thus eliminating the need for a separate solvent; the chlorination to a very high degree without resort to high temperatures or pressures; the enhanced contact of the compound to be chlorinated with the chlorine, thus minimizing or eliminating prolonged agitation and long reaction times; the elimination of pyrolytic decomposition in the highly chlorinated products by the use of lower temperatures and the production of products having a good color; the chlorination of high molecular weight compounds to a very high chlorine content, a procedure heretofore accomplished only with great difficulty; the ability to use ordinary equipment since enamel lined vessels can be avoided; the control of the reaction and the temperature through self-refrigeration by evaporation of the liquid chlorine solvent; the ability to use such vented gases in a separate pre-chlorination step to exhaust the chlorine from the hydrogen chloride by-product; the facility with which the process can be operated; and other advantages that will be apparent from a reading of the following description of suitable modes of practicing the invention.

The process of my invention using liquid chlorine as the chlorinating agent and as the solvent or reaction medium may be carried out as a batch operation or as a continuous operation. In a batch type operation either the liquid chlorine or the compounds to be chlorinated may be first added to the reactor. Generally means are provided to assure a solution of the compound in the chlorine in a single homogeneous reaction phase. If the material to be chlorinated is a solid, any expedient may be resorted to for facilitating the introduction of the solid into liquid chlorine, such as by agitation. To facilitate such a controlled introduction, the solid to be chlorinated may be melted, or it may be dissolved in a small amount of a solvent which may be recovered subsequently. The use of an inert solvent under such circumstances is not excluded provided the conditions are such as to maintain the chlorine in the liquid phase, so as to provide a homogeneous solution comprising the liquid chlorine and the compound to be chlorinated in which the liquid chlorine is the primary solvent. Most of the materials to be chlorinated are sufficiently soluble in liquid chlorine, so that in the preferred embodiment of the invention any solvent other than chlorine is avoided.

Ordinarily there is little or no reaction in the dark at room temperature or below. The reaction is started preferably by admitting light to the reaction vessel, by increasing the temperature, or by introducing a suitable chlorinating catalyst. The reaction rate is reduced or controlled in most cases through the exclusion of light or by cooling, as explained hereinafter.

In a continuous type process the stream of chlorine and the compound to be chlorinated may be metered into a reaction zone, the temperature of which may be controlled or varied, and then passed to a chlorine recovery zone.

The proportions of the compound to be chlorinated and the liquid chlorine can vary over a relatively wide range. It is important that the amount of chlorine be at least sufficient to dissolve the compound and to provide a single homogeneous liquid phase during the reaction. It is preferred that the amount of chlorine be sufficient to dissolve all of the perchlorinated compound obtained at the end of the reaction so that there is no precipitation of the perchlorinated product until after the reaction is complete when the chlorine is evaporated for the purpose of recovering the perchlorinated compound. Commercial economy suggests the use of the minimum amount of chlorine within the above range.

The chlorination process of the invention may be conducted at any temperature at which the desired reaction proceeds at a suitable rate. For most compounds a temperature within the range of 20 to 50° C. is satisfactory. Higher temperatures and higher corresponding pressures can be used but are not usually necessary or desirable. In all instances the pressure must be such as to maintain the chlorine in the liquid phase at the temperature employed, but higher pressures, such as are obtained by an inert gas or with the hydrogen chloride by-product, are contemplated as within the invention.

In some cases, the reaction may be conducted at atmospheric pressure and at a temperature at or below the boiling point of chlorine, i. e., at or below about −35° C.

Hydrogen chloride is formed during the reaction and the pressure rises in the reaction vessel because the physical constants of hydrogen chloride are such that it is not condensed to a liquid under the usual reaction conditions, and it is not appreciably soluble in the reaction mixture or in liquid chlorine.

The reaction is exothermic and an increase in temperature and pressure may be prevented or readily controlled, by venting gas from the reaction. If the gas which is a mixture of hydrogen chloride and chlorine is passed through a reflux condenser before venting, a substantial part of the chlorine vapors will condense and can be returned to the reaction vessel. The vented gases will then comprise all of the hydrogen chloride, and a part or substantially none of the chlorine depending on the operation of the reflux condenser. The temperature may be varied during the chlorination, i. e., it may be raised as the reaction nears the end, for example, by controlling the operation of the reflux condenser. The chlorination may be continued to the point where the evolution of hydrogen chloride will cease under the chlorination conditions, as indicated by the pressure.

At the conclusion of the reaction the chlorine may be separated, for example, it may be evaporated and condensed for reuse, and the perchlorinated product remains. Generally it is in sufficiently pure condition after the separation of the chlorine so as not to require further purification.

The by-product hydrogen chloride containing some chlorine may be used, for example, in a countercurrent process, especially if the starting compound contains any degree of unsaturation. In this way an unsaturated compound, such as rubber, may be saturated by the addition of chlorine to the double bonds thereof, and the resulting saturated compound may be chlorinated by substitution of hydrogen with chlorine in accordance with the invention. If the by-product hydrogen chloride contains but little chlorine, it may be oxidized to water and chlorine gas and the chlorine recovered and reused in the chlorination process. The hydrogen chloride may be marketed as such or absorbed in water and marketed as hydrochloric acid.

If the starting compound contains any degree of unsaturation, the double bonds may be satisfied by any type of addition reaction, such as halogenation, including treatment with liquid chlorine. It is thus possible, for example, to start with an unsaturated aliphatic compound, treat it with liquid chlorine, whereby it is converted to a saturated partially chlorinated aliphatic organic compound by addition of chlorine to the double bonds thereof, and by continuing the liquid chlorine treatment under conditions favoring substitution chlorination, to convert the organic compound to a more highly chlorinated compound in accordance with the invention.

The invention is applicable to a wide variety of non-aromatic compounds which contain hydrogen attached to carbon which hydrogen is replaceable by chlorine, and which are soluble in liquid chlorine. Preferably the compounds also should be liquids or solids (non-gaseous) under the temperature and pressure reaction conditions. Most of the compounds which may be perchlorinated in accordance with the invention include aliphatic and other saturated hydrocarbons, oxygenated aliphatic compounds, and partial chlorination derivatives thereof which are soluble in chlorine; for example, paraffinic and naphthenic hydrocarbons; polyolefins; saturated partially chlorinated hydrocarbons and rubber; fatty acids, such as acetic acid and stearic acid; fatty alcohols; esters such as glyceride oils and fats, ester waxes, beeswax, spermacetic, methyl stearate; fatty acid anhydrides such as stearic anhydride; ethers; ketones such as palmitone; aldehydes, and the like, which are soluble in liquid chlorine. The invention can be applied, among others, to the above compounds of higher molecular weight, i. e., containing 8 or more carbon atoms. Unsaturated organic compounds of the above type may be converted to saturated partially chorinated compounds by addition chlorination at the double bonds and reference to any of said compounds includes partially chlorinated derivatives thereof. These partially chlorinated compounds may be further chlorinated by substitution chlorination in accordance with the invention.

In order to illustrate and point out some of the advantages of the invention, the following specific embodiments are included. These are for illustrative purposes only and are not to be construed as limitations on the invention as it is otherwise disclosed and claimed herein.

Example 1

15 grams of solid paraffin (setting point 52–54° C.) was dissolved in 300 grams of liquid chlorine contained in a suitably insulated vessel at atmospheric pressure. Upon exposure to daylight a vigorous reaction ensued. When the reaction had slowed appreciably, the chlorine was evaporated yielding a white product. The chlorine content of the product was found to be 66.6% by weight. A sample of the product placed in a drying oven near a similar sample of commercial chlorinated paraffin fused in a completely analogous manner, but showed less discoloration than the commercial sample.

Example 2

10 grams of solid paraffin used in Example 1 was dissolved in 200 grams of liquid chlorine in a glass pressure vessel in the dark. The mixture was irradiated with white light. The pressure within the vessel increased; it was regulated within the general range of 125 to 175 pounds per square inch, by venting vapors from the vessel, so that the temperature of the mixture was maintained in the range of 20 to 30° C. Toward the end of the reaction, the temperature was allowed to rise and was maintained at about 32° C. When the pressure levelled off, that is, when the reaction was complete at this temperature under the conditions of light, the pressure was released, and the reaction product was recovered by evaporating the excess liquid chlorine. The polychlorinated paraffin analyzed 69.9 weight per cent chlorine. It softened at 98–100° C., and was pure white in color. It was soluble in carbon tetrachloride, acetone, benzene, toluene, chloro-benzene, glacial acetic acid, and had the same general properties as paraffin chlorinated by conventional methods.

Example 3

Following the procedure of Example 2, 20 grams of stearic acid was dissolved in 200 grams of liquid chlorine and chlorinated. The resulting product analyzed 63.5 weight per cent chlorine. It softened at 93–94° C., and was white in color. The neutralization equivalent was found to be 744. It was soluble in alcohol, acetone, and dilute aqueous alkali.

Example 4

10 grams of sample of a solid commercial polyethylene was dissolved in 350 grams of liquid chlorine and chlorinated following the procedure of Example 2. The resulting product analyzed 69.1 weight per cent chlorine and was white in color. It was somewhat soluble in carbon tetrachloride, benzene, and toluene, from which it deposits a tough transparent film.

Example 5

10 grams of cetyl alcohol was dissolved in 200 grams of liquid chlorine and polychlorinated in accordance with the procedure of Example 2. The resulting product analyzed 68 weight per cent chlorine. It had a light yellow color. It was soluble in carbon tetrachloride, acetone, benzene, chlorobenzene, and slightly soluble in alcohol.

Example 6

10 grams of commercial liquid methyl pentachlorostearate having a chlorine content of about 37.7% was placed in a suitably insulated reaction vessel at atmospheric pressure. About 250 grams of liquid chlorine was added. When the reaction was complete the chlorine was allowed to evaporate, leaving a cream colored brittle solid. The chlorine content was 61.3%.

In view of the foregoing disclosures, variations and modifications thereof will be apparent to one skilled in the art. The invention contemplates all such modifications and variations as come within the scope of the appended claims.

I claim:

1. A process of substitution chlorination of an aliphatic chlorine-soluble saturated compound containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said compound have been replaced by chlorine from said liquid chlorine reaction medium; and then removing the excess unreacted liquid chlorine from the chlorinated compound.

2. A process of substitution chlorination of an aliphatic chlorine-soluble saturated compound containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said compound have been replaced by chlorine from said liquid chlorine reaction medium; and then removing the excess unreacted liquid chlorine from the chlorinated compound.

3. A process of substitution chlorination of an aliphatic chlorine-soluble saturated compound having not less than eight carbon atoms and containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said compound have been replaced by chlorine from said liquid chlorine reaction medium; and then removing the excess unreacted liquid chlorine from the chlorinated compound.

4. A process of substitution chlorination of an aliphatic chlorine-soluble saturated hydrocarbon containing chlorine-replaceable hydrogen atoms attached to carbon, which comprises dissolving said hydrocarbon in liquid chlorine in an amount in substantial excess of the amount to be reacted with said hydrocarbon, said liquid chlorine in excess functioning as the source of chlorine for the chlorination reaction and as a solvent medium for the hydrocarbon during said reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said hydrocarbon have been replaced by chlorine from said liquid chlorine reaction medium; and then removing the excess unreacted liquid chlorine from the chlorinated hydrocarbon.

5. A process of substitution chlorination of an aliphatic chlorine-soluble saturated hydrocarbon having not less than eight carbon atoms and containing chlorine-replaceable hydrogen atoms attached to carbon, which comprises dissolving said hydrocarbon in liquid chlorine in an amount in substantial excess of the amount to be reacted with said hydrocarbon, said liquid chlorine in excess functioning as the source of chlorine for the chlorination reaction and as a solvent medium for the hydrocarbon during said reaction; in the presence of light; at a temperature at which hydrogen atom is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said hydrocarbon have been replaced by chlorine from said liquid chlorine reaction medium; and then removing the excess unreacted liquid chlorine from the chlorinated hydrocarbon.

6. A process of substitution chlorination of paraffin wax, which comprises dissolving said paraffin wax in liquid chlorine in an amount in substantial excess of the amount to be reacted with said paraffin wax, said liquid chlorine in excess functioning as the source of chlorine for the chlorination reaction and as a solvent medium for the paraffin wax during said reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said paraffin wax have been replaced by chlorine from said liquid chlorine reaction medium; and then removing the excess unreacted liquid chlorine from the chlorinated paraffin wax.

7. A process of substitution chlorination of an aliphatic chlorine-soluble saturated oxygenated compound containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said compound have been replaced by chlorine from said liquid chlorine reaction medium; and then removing the excess unreacted liquid chlorine from the chlorinated compound.

8. A process of substitution chlorination of an aliphatic chlorine-soluble saturated ester containing chlorine-replaceable hydrogen atoms attached to carbon, which comprises dissolving said ester in liquid chlorine in an amount in substantial excess of the amount to be reacted with said ester, said liquid chlorine in excess functioning as the source of chlorine for the chlorination reaction and as a solvent medium for the ester during said reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said ester have been replaced by chlorine from said liquid chlorine reaction medium; and then removing the excess unreacted liquid chlorine from the chlorinated ester.

9. A process of substitution chlorination of an aliphatic chlorine-soluble saturated fatty acid having not less than eight carbon atoms, which comprises dissolving said fatty acid in liquid chlorine in an amount in substantial excess of the amount to be reacted with said fatty acid, said liquid chlorine in excess functioning as the source of chlorine for the chlorination reaction and as a solvent medium for the fatty acid during the reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said fatty acid have been replaced by chlorine from said liquid chlorine reaction medium; and then removing the excess unreacted liquid chlorine from the chlorinated fatty acid.

10. A process of substitution chlorination of stearic acid, which comprises dissolving said stearic acid in liquid chlorine in an amount in substantial excess of the amount to be reacted with said stearic acid, said liquid chlorine in excess functioning as the source of chlorine for the chlorination reaction and as a solvent medium for the stearic acid during the reaction; in the presence of light; at a temperature at which hydrogen is substituted by chlorine with the liberation of hydrogen chloride, and at a pressure at least as great as that required to maintain the chlorine in a liquid state at said reaction temperature; continuing the reaction under the above conditions until a plurality of said hydrogen atoms of said stearic acid have been replaced by chlorine from said liquid chlorine reaction medium; and then removing the excess unreacted liquid chlorine from the chlorinated stearic acid.

11. A process of substitution chlorination of an aliphatic chlorine-soluble saturated compound containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; in the presence of light; at a temperature at which hydrogen is substituted by chlorine with the liberation of hydrogen chloride, and at a pressure at least as great as that required to maintain the chlorine in a liquid state at said reaction temperature; venting gaseous hydrogen chloride and gaseous chlorine from the reaction, prechlorinating said compound with the vented gases containing said gaseous chlorine; continuing the reaction under the above conditions until a plurality of said hydrogen atoms of said compound have been replaced by chlorine from said liquid chlorine reaction medium and until the evolution of hydrogen chloride substantially ceases; and then removing the excess unreacted liquid chlorine from the chlorinated compound.

12. A process of substitution chlorination of an aliphatic chlorine-soluble saturated compound containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; in the presence of light; at a temperature at which hydrogen is substituted by chlorine with the liberation of hydrogen chloride, and at a pressure at least as great as that required to maintain the chlorine in a liquid state at said reaction temperature; venting gaseous hydrogen chloride and gaseous chlorine from the reaction, condensing at least a part of the vented gaseous chlorine and returning the condensed liquid chlorine to the reaction zone; continuing the reaction under the above conditions until a plurality of said hydrogen atoms of said compound have been replaced by chlorine from said liquid chlorine reaction medium and until the evolution of hydrogen chloride substantially ceases; and then removing the excess unreacted liquid chlorine from the chlorinated compound.

13. A process of substitution chlorination of an aliphatic chlorine-soluble saturated compound containing chlorine-replaceable hydrogen atoms attached to carbon, which comprises dissolving said compound in liquid chlorine in an amount in substantial excess of the amount to be reacted with said compound, said liquid chlorine in excess functioning as the source of chlorine for the chlorination reaction and as a solvent medium for the compound during said reaction; in the presence of light; at a temperature at which hydrogen is substituted by chlorine with the liberation of hydrogen chloride, and at a pressure at least as great as that required to maintain the chlorine in a liquid state at said reaction temperature; venting gaseous hydrogen chloride and chlorine from the reaction, condensing at least a part of the vented gaseous chlorine and returning the condensed liquid chlorine to the reaction zone; prechlorinating said compound with the vented gases containing the remainer of the gaseous chlorine; continuing the reaction under the above conditions until a plurality of said hydrogen atoms of said compound have been replaced by chlorine from said liquid chlorine reaction medium and until the evolution of hydrogen chloride substantially ceases; and then removing the excess unreacted liquid chlorine from the chlorinated compound.

14. A process of substitution chlorination of stearic acid, which comprises dissolving said stearic acid in liquid chlorine in an amount in substantial excess of the amount to be reacted with said stearic acid, said liquid chlorine in excess functioning as the source of chlorine for the chlorination reaction and as a solvent medium for the stearic acid during said reaction; in the presence of light; at a temperature at which hydrogen is substituted by chlorine with the liberation of hydrogen chloride, and at a pressure at least as great as that required to maintain the chlorine in a liquid state at said reaction temperature; venting gaseous hydrogen chloride and gaseous chlorine from the reaction, condensing at least a part of the vented gaseous chlorine and returning the condensed liquid chlorine to the reaction zone; prechlorinating said stearic acid with the vented gases containing the remainder of the gaseous chlorine; continuing the reaction under the above conditions until a plurality of said hydrogen atoms of the stearic acid have been replaced by chlorine from said liquid chlorine reaction medium and until the evolution of hydrogen chloride substantially ceases; and then removing the excess unreacted liquid chlorine from the chlorinated stearic acid.

FRANCIS EARL LAWLOR.

REFERENCES CITED

The following references are of record in the file of this patent:

UNITED STATES PATENTS

| Number | Name | Date |
| --- | --- | --- |
| 1,194,558 | Skoglund | Aug. 15, 1916 |
| 1,248,065 | Blanc | Nov. 27, 1917 |
| 1,315,542 | Curme | Sept. 9, 1919 |
| 1,939,995 | Lincoln et al. | Dec. 19, 1933 |
| 2,240,275 | Whitmore | Apr. 29, 1941 |
| 2,272,484 | Shelton | Feb. 10, 1942 |

OTHER REFERENCES

"Ind. Chem. Eng.," vol. 27, 1190–1193, "Synthesis from Natural Gas Hydrocarbons," 1935 ed., by Hass, McBee, and Weber.

"Ind. Chem. Eng.," vol. 28, pages 333 to 338, "Chlorination of Paraffins," 1936 ed., by Hass, McBee and Weber.

---

Certificate of Correction

Patent No. 2,571,901　　　　　　　　　　　　　　October 16, 1951

FRANCIS EARL LAWLOR

It is hereby certified that error appears in the printed specification of the above numbered patent requiring correction as follows:

Column 4, line 10, before "The" insert the following sentence: *Light may be used to facilitate the reaction.*; column 5, line 40, for "chorinated" read *chlorinated*; column 6, line 6, for "32° C." read *30° C.*; column 10, line 49, for "remainer" read *remainder*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*